May 19, 1931.  R. M. CRITCHFIELD  1,806,336
WINDSHIELD CLEANER
Filed July 27, 1929  2 Sheets-Sheet 1
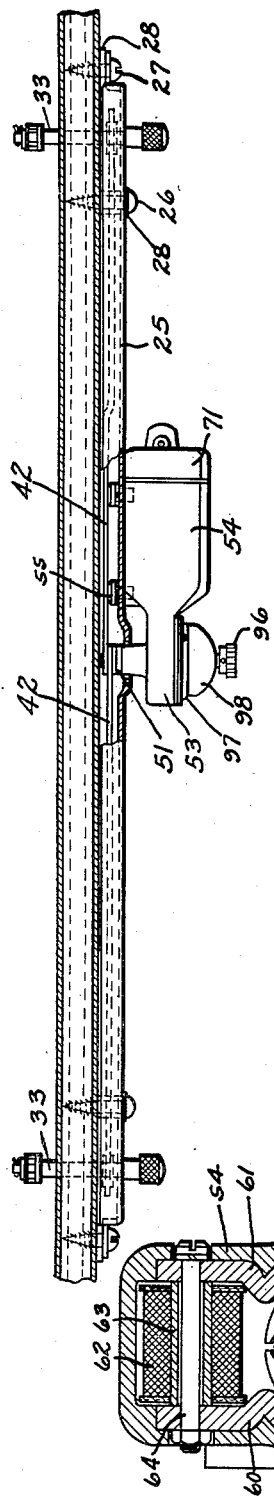
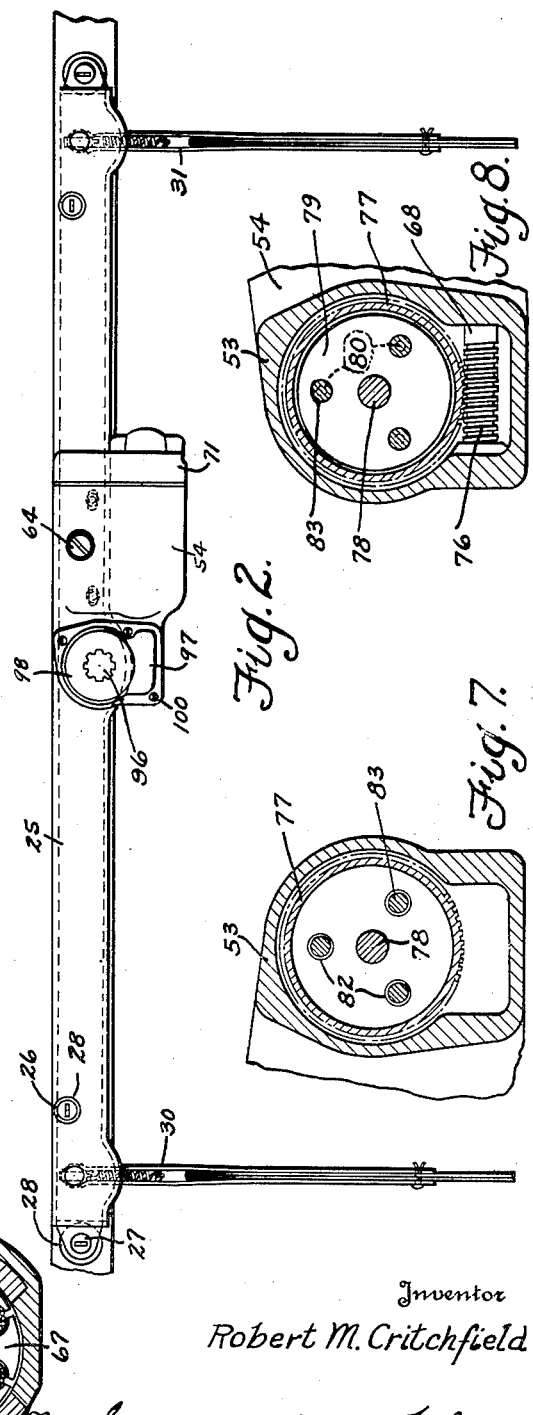
Inventor
Robert M. Critchfield
By Spencer, Hardman + Fehr
Attorney May 19, 1931.  R. M. CRITCHFIELD  1,806,336
WINDSHIELD CLEANER
Filed July 27, 1929   2 Sheets-Sheet 2
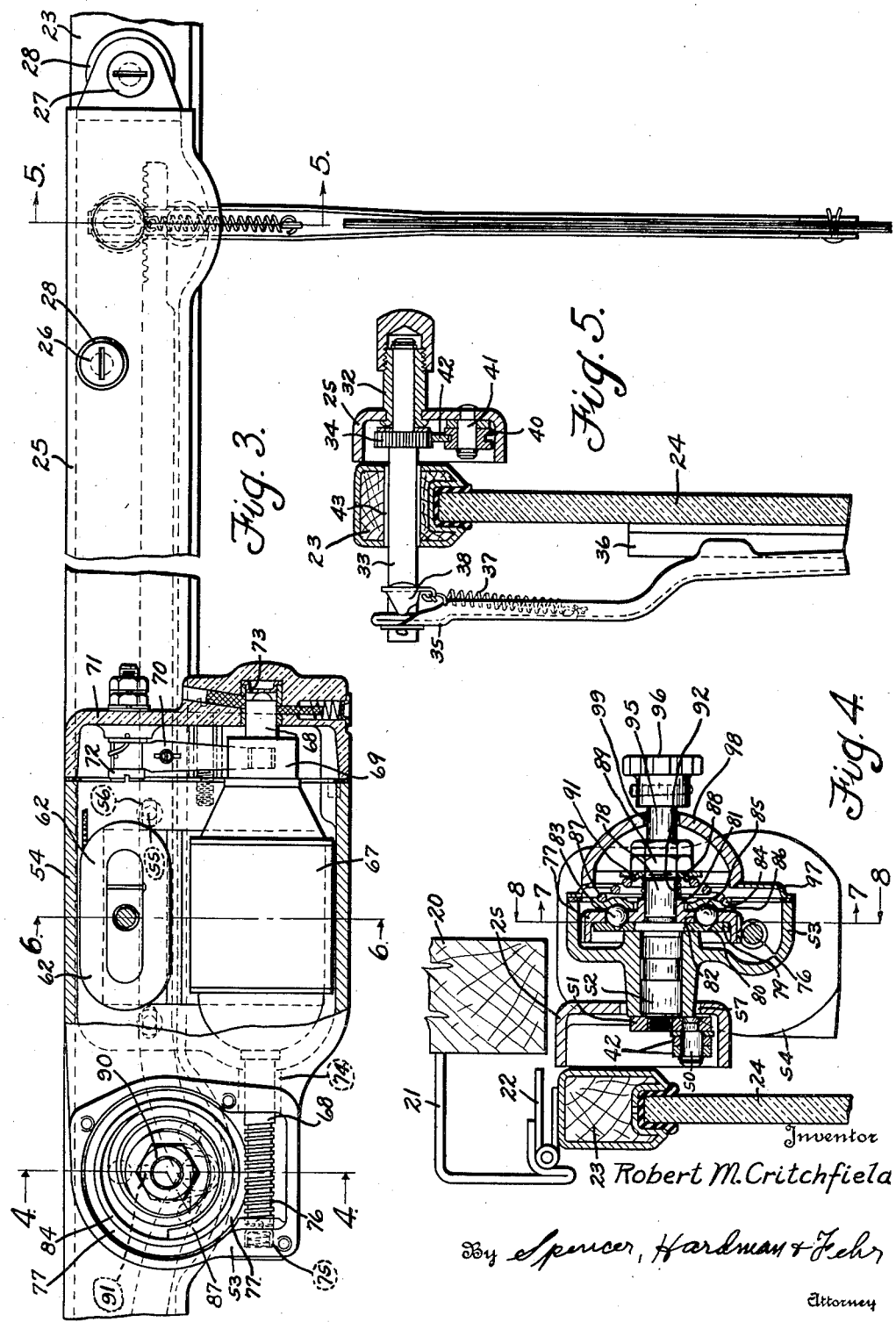
Inventor
Robert M. Critchfield
By Spencer, Hardman & Fehr
Attorney Patented May 19, 1931

1,806,336

UNITED STATES PATENT OFFICE

ROBERT M. CRITCHFIELD, OF ANDERSON, INDIANA, ASSIGNOR TO DELCO-REMY CORPORATION, OF ANDERSON, INDIANA, A CORPORATION OF DELAWARE

WINDSHIELD CLEANER

Application filed July 27, 1929. Serial No. 381,516.

This invention relates to windshield cleaners and is particularly concerned with the driving connection between the motor and the wiper mechanism.

One of the objects of this invention is to provide a mechanism of the class described in which the motor will always have a positively coupled driving relation with the wiping mechanism, and will permit movement of the wiper mechanism independent of movement of the motor, so that the wiping blades may be readily moved to a convenient parking position out of the operator's line of vision.

A further object of the invention is to provide a windshield cleaning mechanism embodying a oneway clutch so that the wiping blades may be moved over the windshield glass independent of any movement of the motor.

A further object is to provide a yielding connection between the driving motor and the wiping mechanism whereby the transmission mechanism will positively translate movement of the motor to the wiper mechanism, but will be non-operative to translate movement of the wiper mechanism to the driving motor.

A further object of this invention is to provide means for moving the wiper blades from a position that they may come to rest at when the driving motor is stopped, to a predetermined position out of the usual field of vision through the windshield glass.

A further object is to provide motor operated means for driving the wiper mechanism, and additional means interconnected with said motor operated means for operation of said wiper mechanism independent of said motor operated means.

Further objects and advantages of the present invention will be apparent from the following description, reference being had to the accompanying drawings wherein a preferred embodiment of one form of the present invention is clearly shown.

In the drawings:

Fig. 1 is a plan view of my improved windshield cleaner mechanism as applied to the rail of the windshield, certain parts being shown in section for clearness of illustration.

Fig. 2 is a rear elevational view of the same as appears from the driver's seat.

Fig. 3 is an enlarged detail in fragmentary section through the driving motor and transmission mechanism.

Fig. 4 is a cross sectional view of the gear train substantially as indicated by the line and arrows 4—4 of Fig. 3.

Fig. 5 is a cross sectional view through the wiper mechanism substantially as indicated by the line and arrows 5—5 of Fig. 3.

Fig. 6 is a cross sectional view through the driving motor substantially as indicated by the line and arrows 6—6 of Fig. 3.

Fig. 7 is a sectional view through the gear train and clutch mechanism, substantially as indicated by the line and arrows 7—7 of Fig. 4.

Fig. 8 is a similar section as indicated by the line and arrows 8—8 of Fig. 4.

With particular reference to the drawings, 20 indicates a rail or part of the vehicle structure supporting a bracket 21 to which is fixed a hinge 22 pivotally supporting a windshield frame 23 carrying a glass 24. To the windshield frame 23, is secured a channel member 25, by attaching screws 26 and 27 and vibration absorbing washers 28, which provides an attaching bracket for a driving motor and mechanism soon to be described. In the present instance the attaching bracket 25 is somewhat elongated so as to extend throughout substantially the greater portion of the windshield frame and pivotally supports at each end thereof a wiping arm assembly 30 and 31. It is obvious of course, that the wiper mechanism may embrace but a single one of the assemblies and that the wiper assembly and driving unit may be more closely associated in point of space, and yet the spirit of the invention preserved.

Each of these assemblies are essentially the same and comprise the structure illustrated in Fig. 5, in which the bracket 25 supports a sleeve bearing 32, in which is journalled a wiper shaft 33 carrying a sprocket 34 and provided with a wiping arm 35. The arm 35 has a wiper blade 36 pivotally supported thereby and resiliently maintained against the glass 24 by spring and clip devices 38 and 37 respectively. In lateral spaced relation with respect to bearings 32 the bracket member 25 provides a guide roller 40 rotatably supported by a stud 41 and is adapted to maintain a rack bar 42 in driving engagement with the sprocket 34 of the wiper shaft 33. The windshield rail 23 is provided with an aperture 43 for freely receiving the wiper shaft 33, so that the driving motor and transmission mechanism may be mounted inside of the windshield frame out of exposure to the weather, and yet permit the wiper blade assembly to be mounted on the exterior of the frame whereby the general appearance of the apparatus will be improved.

The rack bar or bars 42 are coupled to a crank pin 50, supported by a crank 51 drivingly secured to a crank shaft 52 journalled in the gear housing 53. The gear housing 53 forms an integral part of the motor housing and frame 54, which is mounted as a unit upon the bracket 25 so that the crank shaft 52 is substantially midway between the wiper shaft 33, and so that the crank pin 50 and link 51 are disposed within the channel member whereby the rack bars 42 may be connected with the wiper shafts and crank pin and entirely housed within the member 25. The driving motor is secured exterior of the bracket 25 by screws 55 received in elongated apertures or slots 56 in the bracket 25 and threaded into the motor housing 54, so that the motor unit may be shifted lineally between the wiper shafts 33 in order to properly adjust the extremes of the wiper stroke relative to the movement of the crank shaft 52. This shifting feature is furthered by providing an enlarged aperture 57 in the bracket 25 about the protuberance of the gear housing 53 so as to permit slight movements therebetween at least to the extent permitted by screws 55 and slots 56.

In main the driving motor comprises a pair of pole pieces 60 and 61 disposed within the walls of the motor housing 54, securing therebetween a field winding 62, and core 63, by means of a bolt or screw 64 recessed within the walls of the housing 54. The members 60 and 61 are formed with arc like extensions 65 and 66, designed to encircle a rotor 67 mounted upon a motor shaft 68. A commutator 69 upon the armature shaft 68, cooperates with appropriate brush assemblies 70 pivotally secured to a motor housing cover 71. The brush assemblies are secured by stud 72 and are electrically connected with the field winding 62, and a proper source of energy. The cover 71 is secured upon the motor housing 54 in any well known manner as by screws, and the armature shaft 68 has a thrust bearing 73 within the cover 71, and other bearings 74 and 75 in the gear housing 53. The motor shaft 68 provides a worm 76 that meshes with the worm wheel 77 journalled upon the reduced portion 78 of the crank shaft 52.

A clutch connection between the worm wheel 77 and crank shaft 52 is provided, and embodies a driving plate 79 secured upon the crank shaft 52 in non-rotative relation therewith. The plate 79 is provided with a circular row of apertures or recesses 80, which recesses in the present instance conform to conical like depressions. The worm wheel 77 includes a cylindrical hub 81 which forms a journal upon the extension 78 of the crank shaft, and the web of the wheel 77 is provided with a circular row of holes 82, which are equally spaced both circumferentially and radially so as to be coincident with the depressions 80 provided by the driving plate. Within each of these holes of the worm wheel is disposed a steel ball 83. The balls fill the holes 82, of said worm wheel and project a slight distance each side of the web so as to be received within the apertures 80 and yet protrude to some extent through the opposite side of said worm wheel. Spring retaining means are provided for maintaining the balls 83 within the holes 82 of the worm wheel and to urge the said balls into the depressions 80 of the driving plate.

The spring retaining means comprises a retainer plate 84 with reentrant annular grooves 85 and 86, which provide respectively a race for the balls 83 and a keeping flange for a spring 87. The spring 87 is of conical form, the base of which is seated within the groove 86, while the apex thereof is engaged by a keeping washer 88, secured upon the extension 78 by double nuts 89 and 90. The washer 88 is provided with the lugs 91 which are just receivable within the small end turn of the spring 87, and aid to keep the spring in proper position upon the shaft 78. A second spring 92 is placed upon the extension 78 and disposed between the keeping washer 88 and the hub 81 of the worm wheel in order to keep the worm wheel in resilient but firm engagement with the driving plate 79, and so that the teeth of the worm wheel will be maintained in cooperative relation with the worm 76 of the motor shaft 68. With respect to both the springs 87 and 92 the washer 88 and double nut structure provide a firm abutment from which the springs transmit their energizing force.

The shaft 78 is further reduced, or it may be extended, without reduction, and the projection thereof 95 is provided with a thumb wheel 96 drivingly secured to it in any preferred manner. The gear housing 53 is provided with a cover 97 which supports a cap 98 apertured at 99 to receive the extension 95 of the crank shaft 52, and is retained upon the gear housing 53 by attaching screws 100.

In the operation of this device, energization of the motor will cause a rotation of the motor shaft 68 and by reason of the worm 76 and worm wheel 77 will translate the motor movement through a rotation of the crank shaft 52, whereby the rack bars 42 will be reciprocated to oscillate the wiper arm assemblies 30 and 31. The operative connection between the motor shaft 76 and the crank shaft 52 is such that energization of the motor will positively translate its movement to the shaft 52, and yet, when movement of the wiper mechanism is made independent of the motor, that movement of the crank shaft 52 will not be translated to movement of the motor shaft 76. Further, by reason of this, the wiper mechanism may be operated by the thumb wheel 96, independent of any movement of the motor or motor shaft. These features are made possible by use of the particular clutch that has been disclosed herein. When motion is transmitted to the worm wheel 77 by the motor shaft, the force thereof is applied axially of the balls 83 or substantially squarely against the face or surface of the balls, and they being urged into engagement with the recesses 80 of the plate 79, by means of the retainer mechanism including the stiff spring 87, the plate 79 will be turned with the worm wheel which will result in driving of the crank shaft 52.

Upon assemblying of the parts, should it be discovered that these facts do not satisfactorily obtain, the nuts 89 and 90 are run further upon the portion 78 of the crank shaft in order to place the spring 87 under greater tension, and when the proper tension has been determined the nut 90 is turned relatively to the nut 89 sufficient to maintain the established tension by locking the predetermined tension adjustment. However, should it be desired to operate the wiper mechanism manually in order to give a few wiping strokes to the windshield, or in order to move the wiping arms from that position to which they come to rest when the motor is stopped, to a parked position when the wiping arm assemblies 30 and 31 are at one extreme or the other of the area of vision of the windshield, then the thumb wheel 96 is rotated, which turns with it the driving plate 79. This movement of the hand wheel 96 and of the driving plate 79, will not operate to drive the worm wheel 77 since the inclined surfaces of engagement between the depression 80 and the slight extension of the balls 83 will only tend to cant the balls 83 away from the plate 79 toward the retainer plate 84 which is allowed to move away from the worm wheel 77 by reason of the spring 87. Aside from the operation of the rack bars 42, and the wiper arm assemblies 31 movement of the crank shaft 52 is resisted only by the frictional engagement that may exist between the plate 79 and worm wheel 77 due to the tension of the spring 92.

While the form of embodiment of the present invention as herein disclosed, constitutes a preferred form, it is to be understood that other forms might be adopted, all coming within the scope of the claims which follow.

What is claimed is as follows:

1. In a windshield cleaner the combination comprising, a motor, means supporting said motor, wiper mechanism adapted for engagement with the windshield also supported by said means and driven by said motor, and a clutch connecting said motor to said wiper mechanism comprising, a crank shaft provided with a recessed driving plate, a worm wheel driven by said motor and providing a circular row of holes coincident with said plate recesses, balls disposed in said holes and a spring retainer acting to maintain said plate, wheel and balls in coupled engagement only when said wheel is driven by said motor, whereby said wiper mechanism will be actuated when said motor is energized and may be actuated without energization of said motor.

2. In a windshield cleaner the combination comprising, a motor, means supporting said motor, wiper mechanism adapted for engagement with the windshield also supported by said means and driven by said motor, and a clutch connecting said motor to said wiper mechanism comprising, a driving plate secured to a crank shaft and provided with a circular row of holes, a worm wheel driven by said motor and providing a circular row of holes coincident with said plate holes, balls carried in said holes and a spring retainer acting to maintain said plate, wheel and balls in coupled engagement only when said wheel is driven by said motor, whereby the worm wheel is yieldingly connected with the crank shaft and movement of the wiper mechanism can be made without moving said motor.

3. In a windshield cleaner the combination comprising, a motor, a bracket supporting said motor, wiper mechanism supported by said bracket and operatively connected with said motor, and a clutch in said operative connection, said clutch comprising, a recessed plate secured to said crank shaft, a worm wheel rotatable upon said crank shaft and providing apertures in the webs thereof coincident with the recesses in said plate, balls received by said apertures and a retainer urging said balls into said plate recesses whereby the worm wheel is yieldingly connected with the crank shaft and movement of the wiper mechanism can be made without moving said motor.

4. In a windshield cleaner the combination comprising, a motor, a bracket supporting said motor on a windshield frame, wiper mechanism supported by said bracket and operatively connected to said motor, said connection comprising, a motor and a crank shaft driven thereby, and a clutch interposed between said shafts comprising a recessed plate secured to said crank shaft, a worm wheel rotatable upon said crank shaft and providing openings in the web thereof coincident with the recesses of said plate, balls carried by said worm wheel and a retainer urging said balls into said plate recesses whereby the worm wheel is yieldingly connected with the crank shaft and movement of the wiper mechanism can be made without moving said motor.

5. In a windshield cleaner the combination comprising, a motor, means supporting said motor, wiper mechanism adapted for engagement with the windshield also supported by said means and driven by said motor, and a clutch connecting said motor to said wiper mechanism comprising, a crank shaft provided with a driving plate, a worm wheel journalled on said shaft and drivingly connected to said motor, said wheel providing a circular row of holes and a steel ball in each hole, said plate presenting a similar row of recesses coincident to said holes, and a spring retainer device maintaining said balls in said holes and urging said balls into said plate recesses, whereby said wiper mechanism will be actuated when said motor is energized and may be actuated without energization of said motor.

In testimony whereof I hereto affix my signature.

ROBERT M. CRITCHFIELD.